Sept. 4, 1951 A. H. DICKINSON 2,566,933

ELECTRONIC COUNTER

Filed Nov. 21, 1947 2 Sheets-Sheet 1

INVENTOR
ARTHUR H. DICKINSON
BY John R. Shipman
ATTORNEY

FIG. 2.

Trigger Circuits

| Input Impulse | I | | II | | III | | IV | |
|---|---|---|---|---|---|---|---|---|
| | $V_1$ | $V_2$ | $V_3$ | $V_4$ | $V_5$ | $V_6$ | $V_7$ | $V_8$ |
| 0 | X | 0 | X | 0 | X | 0 | X | 0 |
| 1 | 0 | X | X | 0 | X | 0 | X | 0 |
| 2 | X | 0 | 0 | X | X | 0 | X | 0 |
| 3 | 0 | X | 0 | X | X | 0 | X | 0 |
| 4 | X | 0 | X | 0 | 0 | X | X | 0 |
| 5 | X | 0 | X | 0 | X | 0 | 0 | X |
| 6 | 0 | X | X | 0 | X | 0 | 0 | X |
| 7 | X | 0 | 0 | X | X | 0 | 0 | X |
| 8 | 0 | X | 0 | X | X | 0 | 0 | X |
| 9 | X | 0 | X | 0 | 0 | X | 0 | X |
| 10 | X | 0 | X | 0 | X | 0 | X | 0 |

Note:-
X = Conductive
0 = Non-Conductive

INVENTOR
ARTHUR H. DICKINSON
BY John R. Shipman
ATTORNEY

Patented Sept. 4, 1951

2,566,933

UNITED STATES PATENT OFFICE 2,566,933

ELECTRONIC COUNTER

Arthur H. Dickinson, Greenwich, Conn., assignor to International Business Machines Corporation, New York, N. Y., a corporation of New York Application November 21, 1947, Serial No. 787,376

2 Claims. (Cl. 250—27)

This invention relates to an electronic counting circuit and is particularly directed to a counting circuit of the series chain type for counting a succession of discrete voltage impulses.

An electronic counter of the series chain type ordinarily includes a plurality of electronic trigger circuits, each having two different stable conditions which it may assume alternately. Such a trigger circuit may be changed or switched from either condition of stability to the other condition upon proper application to the trigger circuit of an operating voltage impulse of a predetermined character. Frequently such trigger circuits are connected in a series chain so that upon two changes of the condition of any particular trigger circuit a single output voltage impulse is supplied therefrom to the next succeeding trigger circuit in the chain to switch that next trigger circuit. Then, by applying the input voltage impulses which are to be counted to the first trigger circuit only in the chain, a multidenominational counter in the binary system of numerical notation is provided.

Since the binary system is difficult to interpret and is not satisfactory for many operations, binary counters, as described, are sometimes modified to produce counters for use with a more familiar numerical system. A typical modification is one in which counting progresses in a binary fashion but at some point in the counting, the condition of stability of one or more of the trigger circuits relative to the other trigger circuits is changed from that corresponding to a binary operation, so that all of the trigger circuits are returned to their initial or zero condition of stability by the tenth count. This change is often accomplished by a feedback capacitor or capacitors interconnecting certain trigger circuits for feeding voltage pulses, other than the regular output impulses, from one trigger circuit to another.

It is an object of my invention to provide an electronic counter employing a plurality of trigger circuits connected in a series chain in the manner usual for counting in the binary system but having a novel arrangement for automatically changing the condition of stability of one or more of the trigger circuits relative to the others to depart from the binary system at a predetermined point in a counting cycle.

Another object is to provide a new and improved electronic counter for counting in the scale of five or in the scale of ten.

Still another object is to provide a novel electronic counter of the series chain type for counting in the quinary system.

A further object is to provide a novel electronic counter of the series chain type for counting in the bi-quinary system.

A still further object is to provide a new and improved electronic counter of the series chain type for very rapid counting in the scale of ten which avoids the use of feedback capacitors, the reactive effects of which capacitors I have discovered tend to make a counter phase and frequency sensitive and so reduce the maximum speed of operation.

Another object is to provide a novel electronic counter of the series chain type employing a plurality of trigger circuits in which the trigger circuits are responsive to a series of discrete voltage impulses to operate sequentially in a predetermined pattern with the pattern being completed by the first five impulses supplied thereto and repeated with every five succeeding impulses.

Another object is to provide a novel electronic counter incorporating a plurality of trigger circuits arranged to complete a predetermined pattern of sequential operation with the first five voltage impulses counted and to repeat the pattern with every five succeeding impulses, and which also incorporates an additional trigger circuit responsive to operation of the other trigger circuits to provide a pattern of sequential operations of all of the trigger circuits which is completed with the first ten impulses counted and repeated with every ten succeeding impulses.

According to my invention, an electronic counter is provided incorporating a plurality of trigger circuits connected in a series chain. Input voltage impulses to be counted may be applied to more than one trigger circuit and a control circuit is arranged to determine which of the trigger circuits to which input impulses may be applied, is to be switched by a particular input impulse. More specifically, for a counter in either the scale of five or the scale of ten, input impulses may be applied to the first trigger circuit and to the third trigger circuit and a control circuit is provided for determining which of the input impulses is applied to the first trigger circuit.

The arrangement for applying an input impulse to the third trigger circuit is such as to result in that third trigger circuit being switched by an input impulse only when the higher trigger circuit is in a certain one of its two stable conditions. Thus, each time the third trigger circuit is in that certain condition the next input impulse is effective to switch the third trigger circuit and thereby advance the count in the counter by four, inasmuch as four input impulses applied in the usual manner to the first trigger circuit only, would be required to switch the third trigger circuit.

According to my invention, input impulses to be counted are applied to the first trigger circuit through the control circuit in such manner as to cause that first trigger circuit to be switched normally by each input impulse. However, as previously indicated, the control circuit is responsive to the status of the third trigger circuit. The arrangement is such that whenever the third trigger circuit is in a stable condition in which an input impulse directly applied thereto would effect a switching of the third trigger circuit, the control circuit is effective to prevent application to the first trigger circuit of the same input impulse.

It is then evident that the switching of the third trigger circuit by direct application thereto of but a single impulse, while switching of the first trigger circuit simultaneously therewith is prevented, produces counting in the quinary system with but three trigger circuits in the chain. A fourth trigger circuit is added to the chain to be switched with every output impulse of the third trigger circuit and thereby provides counting in the scale of ten.

The control circuit, according to my invention, may incorporate three tubes. Input impulses are applied directly to the input of the first of these tubes which is effective to shape and amplify the pulse. The output from the first tube is transferred to the input of the second tube, the output of which is coupled to the first trigger circuit. The third tube is connected in parallel with the second tube and has its grid connected directly to the control grid of one of a pair of tubes in the third trigger circuit. This grid arrangement is such that when the third trigger circuit is in condition to be switched by an input impulse, the third tube is conductive preventing a pulse transfer from the second tube to the first trigger circuit.

Other objects of the invention will be pointed out in the following description and claims and illustrated in the accompanying drawings, which disclose, by way of example, the principle of the invention and the best mode, which has been contemplated, of applying that principle.

In the drawings:

Fig. 2 is a table in which are tabulated the conditions of the various tubes in the circuit of Fig. 1 during a counting operation.

Figure 1:
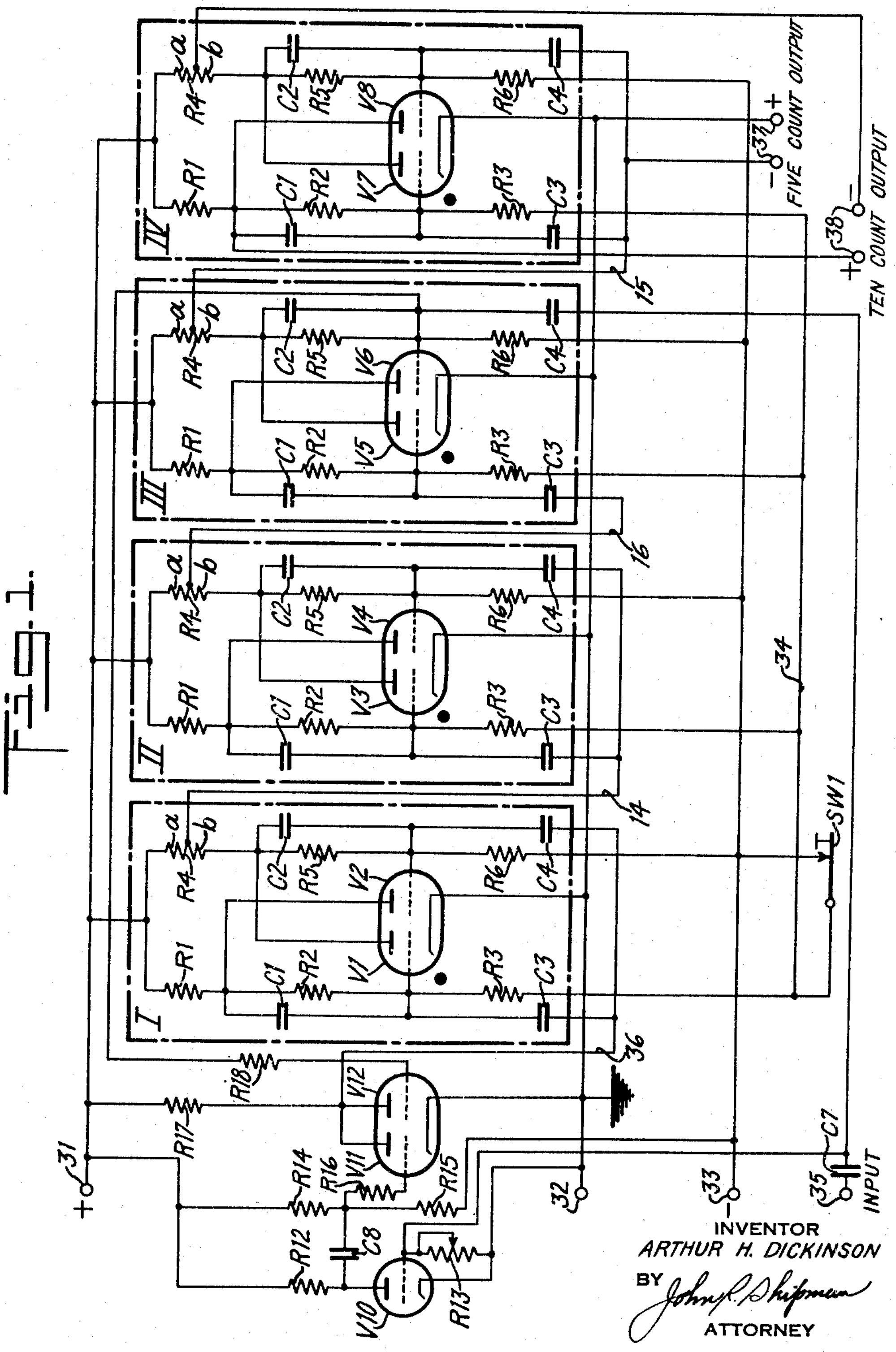
Fig. 1 is a circuit diagram illustrating one embodiment of my invention as applied to a counter for counting in the scale of five or in the scale of ten.

Referring to the drawings, in Fig. 1 the counter is shown as comprising four identical electronic trigger circuits I, II, III and IV set off, for convenience, in separate broken line boxes. Each of the trigger circuits I, II, III and IV, as illustrated, includes a twin vacuum tube comprising in effect two tubes within a single envelope, each having an anode, a cathode and a control grid. It will be understood, of course, that each twin tube may be replaced by two separate tubes if desired. Filaments and the energizing circuits therefor, which are customary with such tubes, have been omitted from the diagram to afford greater clarity.

Identical elements, except the tubes, in the four trigger circuits I, II, III and IV have the same reference characters applied thereto. For convenience in explaining the operation, the left-hand halves of of the tubes of the trigger circuits I, II, III and IV are referred to as V1, V3, V5 and V7 respectively and the right-hand halves as V2, V4, V6 and V8 respectively. As the four trigger circuits are identical, only the first trigger circuit I will be described in detail.

The anode of tube V1 of the first trigger circuit I is connected to the anode of tube V2 through a pair of series connected resistors R4 and R1. The injunction point of these resistors R1 and R4 is connected to a common positive voltage supply terminal 31. The common cathode of tubes V1 and V2 is connected to the grounded voltage terminal 32. The anode of tube V2 is coupled to the control grid of tube V1 through a resistor R2 in parallel with a capacitor C1. Similarly, the anode of tube V1 is coupled to the control grid of tube V2 through a resistor R5 in parallel with a capacitor C2. The control grids of tubes V1 and V2 are additionally connected through resistors R3 and R6 respectively to a reset line 34 and a negative voltage terminal 33 respectively. A normally closed reset switch SW1 interconnects the reset line 34 and the negative terminal 33. A pair of capacitors C3 and C4 are connected in series in the order named between the control grid of tube V1 and the control grid of tube V2. Voltage impulses for switching the first trigger circuit are then to be applied to the junction point between capacitors C3 and C4 and through such capacitors to the control grids of tubes V1 and V2.

The operation of a trigger circuit as described is well known. An understanding of this operation may be facilitated if it is assumed that at some instant the grid of tube V1 is at substantially the same voltage as its cathode. Tube V1 is then highly conductive and with the resistance of the resistor R4 properly chosen has a very low impedance compared with that of resistor R4. Current through the tube V1 is then very large and the anode voltage is not much greater than that of terminal 32. With the resistance of resistors R5 and R6 properly chosen, the voltage drop across the resistor R5 between the anode of tube V1 and the grid of tube V2 is sufficient to maintain the grid voltage of tube V2 below its cut-off value. Hence, the tube V2 is non-conductive and its anode voltage is so high that the voltage drop across the resistor R2 is not sufficient to force the grid voltage of tube V1 below the voltage of terminal 32 so that tube V1 remains highly conductive. With tube V1 highly conductive and tube V2 non-conductive, the trigger circuit is in one of its two stable conditions.

To change or switch the tube or circuit to its other stable condition a negative impulse may be applied through the capacitors C3 and C4 to the grids of tubes V1 and V2. Since tube V2 is already non-conductive, as set forth above, this impulse does not produce any direct effect on that tube. However, the application of the negative impulse to the grid of tube V1 causes the voltage of the grid to become more negative, so that current flow through resistor R4 and the tube V1 to terminal 32 is reduced. This causes the voltage of the anode of tube V1 to rise very rapidly so that a positive voltage impulse is applied through the capacitor C2 to make the grid of tube V2 more positive. Thus the voltage of the grid of tube V2 rises quickly to a value above the cut-off value and current flow through V2 and its plate resistor R1 starts substantially instantaneously.

When the tube V2 thus becomes conductive, the voltage at the anode of tube V2 drops rapidly to cause a negative voltage impulse to be fed through capacitor C1 to the grid of tube V1, augmenting the negative impulse received through resistor R17 and capacitor C3 so that if the grid voltage of tube V1 has not already been dropped below the cut-off value, this lowered anode voltage of tube V2 results in a further decrease in the grid voltage of tube V1 and a corresponding increase in the anode voltage of tube V1 to increase the grid voltage of tube V2. This action continues until tube V1 is non-conductive and tube V2 is highly conductive. The lowered anode voltage of tube V2 with the voltage drop across resistor R2 tends to maintain tube V1 non-conductive thereafter. This second condition in which the tube V1 is non-conductive and the tube V2 is highly conductive is the second stable condition of the trigger circuit.

The trigger circuit is maintained in the second stable condition until another or second negative impulse is applied to the grids of tubes V1 and V2. This second negative impulse drops the voltage of the grid of the conductive tube V2, producing an increase in the anode voltage thereof to transmit a positive impulse to the grid of the non-conductive tube V1. Tube V1 thereupon begins to conduct current and the resulting drop in its anode voltage is applied to the grid of tube V2 to drop the voltage thereof below the cut-off value. Tube V2 becomes non-conductive and tube V1 conductive, so that the trigger circuit is again in its first stable condition.

It will be understood that when tube V2 is conductive and tube V1 is non-conductive, every point on the right-hand resistor network comprising resistors R4, R5 and R6 is at the higher of two voltages and every point on the left-hand resistor network comprising resistors R1, R2 and R3 is at the lower of two voltages. In the other stable condition, when tube V1 is conductive and tube V2 is non-conductive, every point on the resistor network R1, R2 and R3 is at the higher of two voltages and every point on the resistor network R4, R5 and R6 is at the lower of two voltages. This condition enables an output voltage impulse to be taken from the trigger circuit through a lead wire 14 connected to an intermediate point on resistor R4. Thus when tube V2 is conductive, this intermediate point is at the higher of two voltages, but when the trigger circuit is thereafter switched and tube V1 becomes conductive, the intermediate point on resistor R4 is at the lower of the two voltages and a negative voltage impulse is supplied through the output lead wire 14. From the foregoing, it is apparent that such a negative voltage impulse is supplied through output lead wire 14 once for every two negative impulses applied to the grids of tubes V1 and V2.

The output lead wire 14 from the first trigger circuit I is connected to the grids of tubes V3 and V4 of the second trigger circuit II through the associated capacitors C3 and C4. Similarly, the output lead wire 15 of the third trigger circuit III is connected to the grids of tubes V7 and V8 of the fourth trigger circuit IV. It is to be particularly noted, however, that the output lead wire 16 of trigger circuit II is connected to the grid of tube V5 only of the third trigger circuit III, the grid of tube V6 being connected through capacitor C4 and another capacitor C7 to an input terminal 35.

It should also be pointed out at this time that while both negative and positive voltage impulses are supplied at different times through the output lead wires 14, 16 and 15, it is well known that because of the grid current in tubes V2, V4 and V6 the positive impulse does not have as steep a wave front nor as great a peak magnitude as the negative impulse. Consequently, the values of the resistors and capacitors in the grid circuits of the tubes of the trigger circuits may be chosen so that only the negative impulses are effective to switch the trigger circuit so supplied.

Input impulses to be counted are supplied in the form of negative voltage impulses from a suitable source, not shown, through the input terminal 35. These input impulses are applied through the capacitor C4 of the third trigger circuit III to the grid of tube V6. The input impulses are also applied through an intermediate control system, to be presently described, to the grids of tubes V1 and V2 of the first trigger circuit I.

The control system is illustrated as comprising a triode V10 and a twin triode V11 and V12 and is interposed between the input impulse terminal 35 and the first trigger circuit I as shown. Tubes V10 and V11 with their associated circuit elements act as pulse shapers, limiters and phase inverters, while tube V12 acts as a control tube.

The anode of triode V10 is connected through a load resistor R12 to the positive terminal 31. The cathode of triode V10 is directly connected to the grounded terminal 32, and the control grid of triode V10 is connected, through the capacitor C7, to the input terminal 35, and is also coupled via a variable resistor R13 to the grounded terminal 32.

The anode of triode V10 is also coupled through a capacitor C8 to an intermediate point on a voltage divider comprising resistors R14 and R15 connected in series between the terminals 31 and 33. The control grid of the tube V11 is connected through a resistor R16 to this intermediate point on the divider R14, R15. The common cathode of the tubes V11 and V12 is connected directly to the grounded terminal 32, while the anodes of these tubes are conductively connected together and through a load resistor R17 to the positive terminal 31. The anodes of tubes V11 and V12 are also coupled to the grids of tubes V1 and V2 of the first trigger circuit I, through wire 36 and capacitors C3 and C4 respectively. The grid of tube V12 is connected through a resistor R18 directly to the grid of tube V6 in trigger circuit III.

Since the grid of triode V10 is connected through resistor R13 to its cathode, providing a substantially zero bias voltage, a substantial current normally flows through triode V10 and its associated load resistor R12. The resulting voltage drop across its load resistor R12 normally maintains the anode of triode V10 at a relatively low voltage.

When a negative input impulse appears at the input terminal 35, it is transmitted through the capacitor C7 to the grid of triode V10 so that the flow of current through the tube is substantially reduced. It is preferable to adjust the magnitude of the input impulses so that each one drives the grid of triode V10 below the cut-off value, thereby shaping the output impulse of triode V10 by negative clipping.

When the grid of triode V10 is so driven below cut-off, current flow through the triode ceases and its anode voltage rises substantially to that of the positive terminal 31. As a result, a high amplitude, positive impulse is transmitted through capacitor C8 to the grid of tube V11. The intermediate point on the divider R14, R15 to which the grid of tube V11 is connected is chosen to maintain the grid of tube V11 normally below the cut-off value. However, this positive impulse from triode V10 is of sufficient magnitude to raise the grid voltage of tube V11 to cause the tube to become conductive. The resistor R16 in series with the grid of tube V11 is a current limiting resistor to prevent excessive grid current peaks and to aid in positive peak clipping of the impulse. The resulting negative impulse appearing at the anode of tube V11 when it becomes conductive is transmitted through wire 36 to the first trigger circuit I.

It is to be noted that the production of a negative impulse at the anode of tube V11 depends upon the condition of the tube V12 which is in parallel with tube V11. Since the control grid of tube V12 is connected directly to the junction of resistors R5 and R6 of trigger circuit III, the grid voltage of tube V12 is below the cut-off value whenever tube V6 is non-conductive. On the other hand, whenever tube V6 becomes conductive the grid of tube V12 rises slightly above zero voltage and it becomes conductive for a purpose to be explained presently.

A pair of five count output terminals 37 are provided, one being connected to the grounded terminal 32 and the other to the output lead 15 of the third trigger circuit III. A pair of ten count output terminals 38 are also provided, one being connected to the anode of tube V8 and the other to an intermediate tap on the resistor R4 in the fourth trigger circuit IV. As explained hereinafter, a voltage impulse of the indicated polarity appears across the five count terminal 37, once for each five input impulses counted, and voltage impulse of the indicated polarity appears across the ten count terminals 38, once for each ten input impulses counted.

The operation of the counter may be better understood by reference to Fig. 1 and to the table of Fig. 2. Before operation of the counter is initiated, the trigger circuits must be placed in an initial or zero condition. To accomplish this, the hand switch SW1 is momentarily opened. As previously indicated, the hand switch SW1 is normally closed to interconnect the negative voltage terminal 33, to which the resistors R6 of all of the trigger circuits are connected, and the common reset line 34, to which the resistors R3 of all of the trigger circuits are connected. When switch SW1 is momentarily opened, all points on the resistor network comprising resistors R1, R2 and R3 of each trigger circuit tend to rise in voltage to the voltage of the positive terminal 31 to which resistors R1 are connected. Consequently, the point intermediate resistors R2 and R3 in each trigger circuit, to which the grids of tubes V1, V3, V5 and V7 respectively are connected, rises in voltage to slightly above zero, a further rise being prevented by the flow of grid current for the corresponding tube. However, this value of grid voltage is well above the cut-off value of the corresponding tube and it becomes conductive. Of course, if any one of the tubes V1, V3, V5 and V7 were already conductive when the hand switch SW1 was opened, it would remain in the conductive state. Thus, after the hand switch SW1 is opened, all of the trigger circuits assume that condition of stability in which the tubes V1, V3, V5 and V7 are conductive, as indicated in Fig. 1 by the dot adjacent each of these tubes and as shown in Fig. 2 for the zero condition. Thereafter, switch SW1 is reclosed to apply the normal bias to the grid of tubes V1, V3, V5 and V7 which alone cannot effect a change in the conditions of stability of the trigger circuits.

With the trigger circuits in their zero condition, the first negative input impulse to be counted may be applied to the input terminal 35 and it is transmitted through the coupling capacitor C7 to the grid of triode V10 in the control system and also through capacitor C4 to the grids of both tube V6 in the third trigger circuit III and of tube V12 in the control circuit. Since the grids of tube V6 and of tube V12 are already below the critical value, no change in the condition of these tubes is produced. However, the negative input impulse will render triode V10 non-conductive, which in turn will cause tube V11 to become conductive and, since tube V12 is non-conductive, thereby transmit a negative impulse to the first trigger circuit I. The first trigger circuit I is thereupon switched so that tube V2 becomes conductive and tube V1 becomes non-conductive.

The second negative input impulse likewise has no effect upon trigger circuit III but is transmitted through the control circuit to again switch the first trigger circuit I, which in turn will now switch trigger circuit II, as is shown in Fig. 2.

The third negative input impulse also has no effect upon trigger circuit III and is effective to switch only the first trigger circuit I.

The fourth negative input impulse likewise has no direct effect upon trigger circuit III. However, this fourth impulse causes tube V11 to become conductive to switch the first trigger circuit I causing, in turn, trigger circuit II to be switched which, in its turn, supplies a negative impulse to the grid of tube V5 in trigger circuit III. As a result, the third trigger circuit III is now switched and tube V6 now becomes conductive. As tube V6 becomes conductive, tube V5 becomes non-conductive and the grid of tube V12 rises above the critical value and this tube also becomes conductive. As tube V11 will not have become non-conductive by the time tube V12 becomes conductive, the transfer of current flow from tube V11 to tube V12 does not produce a substantial change in their anode voltage which remains low as long as tube V6 and therefore tube V12 remains conductive.

When the fifth negative input impulse is received at the input terminal, it is applied through capacitors C7 and C4 to the grid of tube V6 to directly render that tube non-conductive and switch trigger circuit III. As tube V6 becomes non-conductive, the reduction in voltage at the point between resistors R5 and R6 in trigger circuit III starts to render tube V12 non-conductive. However, at this same time, the fifth negative input impulse acts through triode V10 to attempt to render tube V11 conductive. Since the anode voltage of tube V11 is relatively low because tube V12 is still conductive, the transfer of current flow from tube V12 to tube V11 does not produce a substantial change in the common anode voltage and, therefore, does not produce a substantial negative impulse to switch the first trigger circuit I. It is thus apparent that the fifth negative input impulse is effective to directly switch trigger circuit III, but this impulse is prevented from switching the first trigger circuit I.

It can now be understood that the first three trigger circuits I, II and III complete a predetermined pattern of sequential operation during the first five input impulses and this pattern is repeated with every succeeding five input impulses counted.

The direct switching of the third trigger circuit III by the fifth negative input impulse causes an output impulse to be supplied to the fourth trigger circuit IV and to appear across the five count terminals 37. It follows that the trigger circuit IV is switched in one direction upon counting of the first five input impulses and is switched in the other direction upon counting of the next five impulses so that a useful output impulse of the indicated polarity is provided from the fourth trigger circuit IV across the ten count terminals 38 with every ten input impulses counted.

In apparatus constructed and operated in accordance with the circuit diagram of Fig. 1, the following components were employed:

| Tubes | Resistors | Capacitors |
|---|---|---|
| V1—V2<br>V3—V4<br>V5—V6=6J6<br>V7—V8<br>V10<br>V11—V12 | R1=.01 meg.<br>R2, R5=.125 meg.<br>R3, R6=.10 meg.<br>R4=.01 meg.<br>R4a, R4b=.005 meg.<br>R12, R17=.003 meg.<br>R13=.10 meg.<br>R14=.62 meg.<br>R15=.33 meg.<br>R16, R18=.005 meg. | C1, C2=100 mmfd.<br>C3=40 mmfd.<br>C4 (I, II, IV)=40 mmfd.<br>C4 (III)=50 mmfd.<br>C7, C8=1.0 mmfd. |

The positive terminal 31 was at +150 volts and the negative terminal 33 was at −100 volts relative to the grounded terminal 32.

While there have been shown and described and pointed out the fundamental novel features of the invention as applied to a preferred embodiment, it will be understood that various omissions and substitutions and changes in the form and details of the apparatus illustrated and in its operation may be made by those skilled in the art, without departing from the spirit of the invention. It is the intention, therefore, to be limited only as indicated by the scope of the following claims.

What is claimed is:

1. An electronic counter comprising a plurality of trigger circuits, each having two conditions of stability to which it may be switched alternately by the proper application threto of operating voltage impulses; circuit means connecting said trigger circuits in a series chain; a source of discrete input operating impulses connected to a predetermined trigger circuit, other than the first and second trigger circuits in the chain. to permit an input impulse to switch said predetermined trigger circuit from only a predetermined one of its stable conditions; said circuit means including connections whereby each trigger circuit, except the highest, upon being individually switched to a particular one of its stable conditions transmits an operating impulse to the next higher trigger circuit effective to switch it from either stable condition unless that next higher trigger circuit is said predetermined trigger circuit in which case the transmitted impulse is effective to switch it from the condition opposite said predetermined one condition thereof; a pair of grid-controlled electronic vacuum tubes connected in parallel with each other and having a common output circuit each of said tubes having two opposite states with respect to conductivity; a grid circuit for one of said tubes coupled to said source to maintain said one tube normally in one of its states and to cause it to be changed momentarily to its opposite state by each impulse from the source; and a grid circuit for the other tube coupled to said predetermined trigger circuit to maintain said other tube normally in one of its states and to cause it to be in its opposite state only whenever said predetermined trigger circuit is in said predetermined one stable condition; said output circuit being coupled to said first trigger circuit to supply thereby an operating impulse to said first trigger circuit upon the occurrence of a source impulse while the other tube is in said one of its states only.

2. A quinary electronic counter comprising three trigger circuits, each having two conditions of stability to which it may be switched alternately by the application thereto of operating voltage impulses; circuit means connecting said trigger circuits in a series chain whereby the first trigger circuit upon being switched to a particular stable condition transmits an operating impulse to the second trigger circuit to switch it from either stable condition, and the second trigger circuit upon being switched to a particular stable condition transmits an operating impulse to the third trigger circuit to switch it from a predetermined one of its stable conditions; a source of successive input operating impulses connected to the third trigger circuit to permit an input impulse to switch the third trigger circuit from only the stable condition opposite said predetermined one condition thereof; a pair of grid-controlled electronic vacuum tubes connected in parallel with each other and having a common output circuit, each of said tubes having two opposite states with respect to conductivity; a grid circuit for one of said tubes coupled to said source to maintain said one tube normally in one of its states and to cause it to be changed momentarily to its opposite state by each impulse from the source; and a grid circuit for the other tube coupled to said predetermined trigger circuit to maintain said other tube normally in one of its states and to cause said other tube to be in its opposite state only whenever said predetermined trigger circuit is in said opposite stable condition; said output circuit being coupled to said first trigger circuit to supply thereby an operating impulse to said first trigger circuit upon the occurrence of a source impulse while the other tube is in said one of its states only.

ARTHUR H. DICKINSON.

REFERENCES CITED

The following references are of record in the file of this patent:

UNITED STATES PATENTS

| Number | Name | Date |
|---|---|---|
| 2,132,655 | Smith | Oct. 11, 1938 |
| 2,173,164 | Hansell | Sept. 19, 1939 |
| 2,272,070 | Reeves | Feb. 3, 1942 |
| 2,381,920 | Miller | Aug. 14, 1945 |
| 2,400,822 | Hansell et al. | May 21, 1946 |

OTHER REFERENCES

Electronics, June 1944, "A Four Tube Counter Decade" by Potter, pages 110–113, 358 and 360.

RCA Review, vol. VII, No. 3, Sept. 1946, "Electronic Counters" by Grosdoff, pages 438–447.